(12) United States Patent
Danto

(10) Patent No.: US 9,114,874 B1
(45) Date of Patent: Aug. 25, 2015

(54) AIRCRAFT HUBCAP STRUCTURE

(71) Applicant: Peter Danto, Lafayette, CA (US)

(72) Inventor: Peter Danto, Lafayette, CA (US)

(*) Notice: Subject to any disclaimer, the term of this patent is extended or adjusted under 35 U.S.C. 154(b) by 3 days.

(21) Appl. No.: 14/017,969

(22) Filed: Sep. 4, 2013

Related U.S. Application Data

(63) Continuation-in-part of application No. 13/408,491, filed on Feb. 29, 2012, now Pat. No. 9,039,101.

(51) Int. Cl.
*B64C 25/36* (2006.01)

(52) U.S. Cl.
CPC ...................... *B64C 25/36* (2013.01)

(58) Field of Classification Search
CPC .......... B60B 7/0013; B60B 7/02; B60B 7/06; B60B 7/061; B60B 7/065; B60B 7/066; B60B 7/068; B60B 7/10; B60B 7/14
USPC .............. 301/37.101, 37.102, 37.34, 37.106, 301/37.371, 37.372, 37.373, 37.376, 108.1, 301/108.4
See application file for complete search history.

(56) References Cited

U.S. PATENT DOCUMENTS

| | | | | |
|---|---|---|---|---|
| 2,762,469 | A * | 9/1956 | Lyon ........................ | 188/264 W |
| 4,929,030 | A * | 5/1990 | Park .......................... | 301/37.25 |
| 5,020,861 | A * | 6/1991 | Gorges ...................... | 301/108.1 |
| 5,417,387 | A * | 5/1995 | Jennings ................... | 244/103 S |
| 6,030,050 | A * | 2/2000 | Ichikawa et al. .......... | 301/37.42 |
| 6,032,900 | A * | 3/2000 | Smith ........................ | 244/103 S |
| 6,595,596 | B1 * | 7/2003 | Polka ....................... | 301/37.102 |
| 6,641,225 | B1 * | 11/2003 | Amodeo, Jr. ............. | 301/37.103 |
| 2007/0246996 | A1 * | 10/2007 | Footit ....................... | 301/37.108 |
| 2009/0015057 | A1 * | 1/2009 | Groomes ................. | 301/37.108 |
| 2011/0101769 | A1 * | 5/2011 | Liao et al. ............... | 301/63.101 |

* cited by examiner

*Primary Examiner* — S. Joseph Morano
*Assistant Examiner* — Jean Charleston
(74) *Attorney, Agent, or Firm* — Thomas R. Lampe

(57) ABSTRACT

Aircraft hubcap structure for attachment to a wheel of an airplane wheel and tire assembly includes a dome-shaped hubcap and a bushing attaching the hubcap and the wheel.

12 Claims, 3 Drawing Sheets

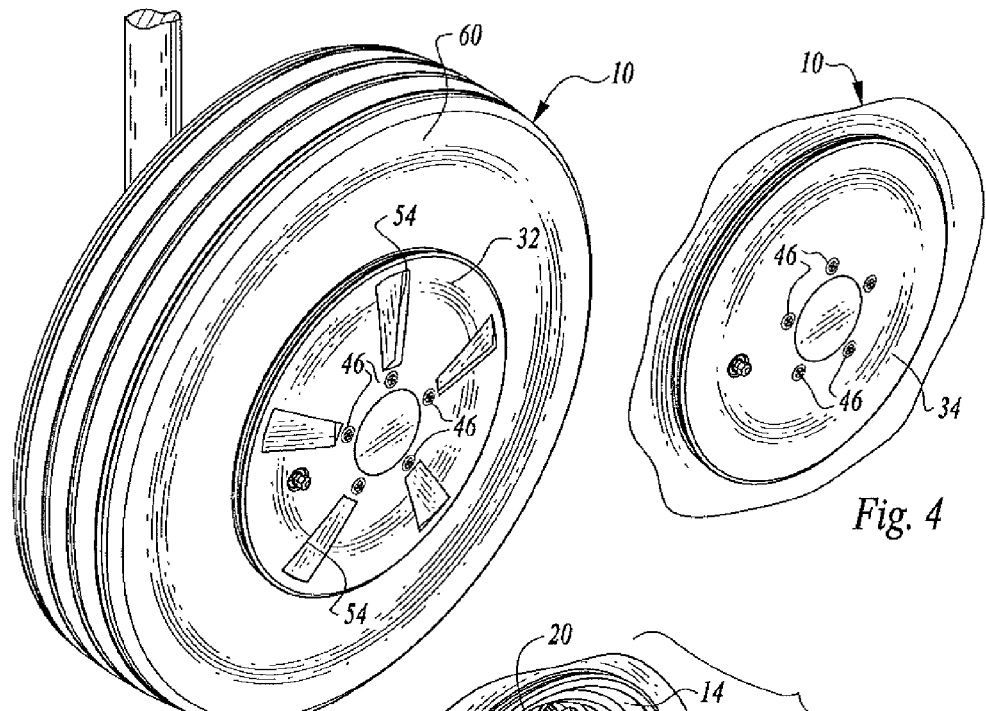
Fig. 1
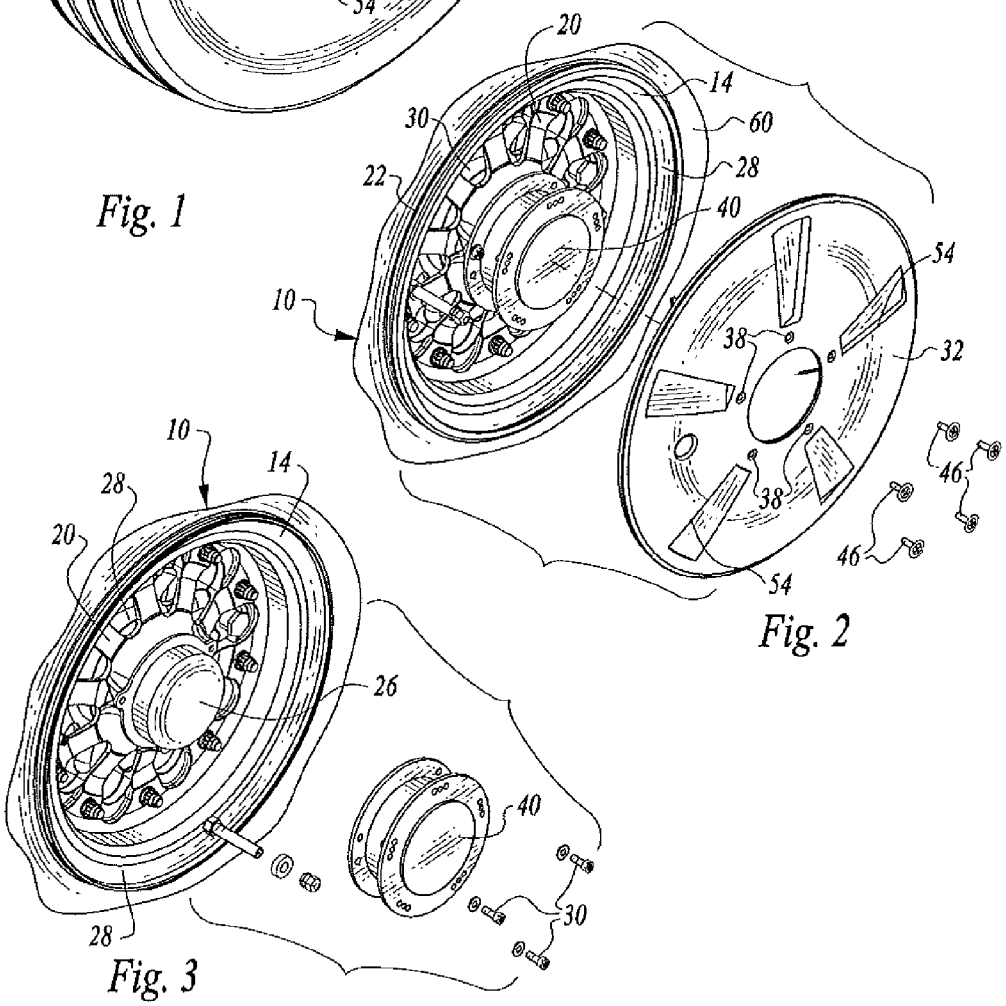
Fig. 4
Fig. 2
Fig. 3

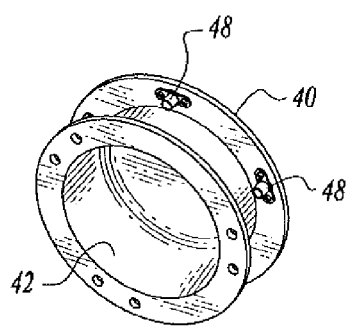
Fig. 5
Fig. 6
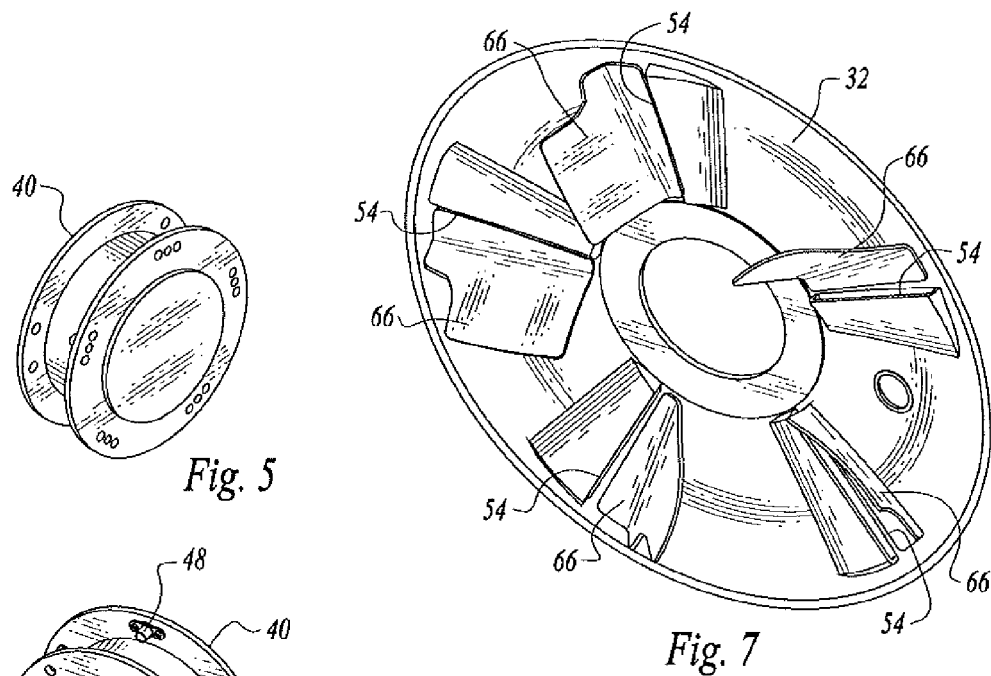
Fig. 7
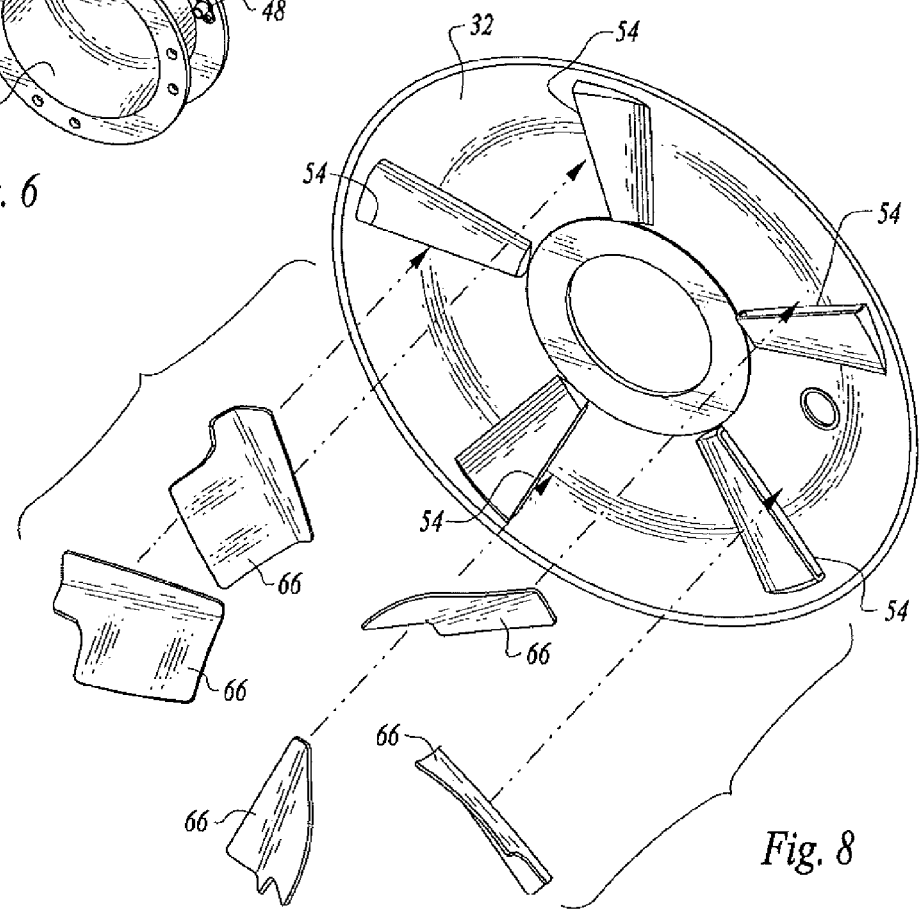
Fig. 8

AIRCRAFT HUBCAP STRUCTURE

This application is a continuation-in-part of U.S. patent application Ser. No. 13/408,491, filed Feb. 29, 2012.

TECHNICAL FIELD

This invention relates to aircraft wheels and more particularly to aircraft hubcap structure for attachment to a wheel of an airplane wheel and tire assembly.

BACKGROUND OF THE INVENTION

The main wheels of certain aircraft have exposed wheel structure that interrupts airflow past the wheel, resulting in diminishment of aerodynamics, performance and operation safety. Diminished aerodynamics adversely impact aircraft speed fin knots) and rate of climb (in feet per minute).

DISCLOSURE OF INVENTION

With the aircraft hubcap structure of the present invention airflow over the hubcap and the airplane wheel and tire assembly is optimized. Good airflow is good aerodynamics, resulting in better performance and safer operations. With the present invention an increased speed and rate of climb are provided. Safety is enhanced through utilization of the present invention since better climb is critical in emergency operations where an engine may be shut down and the aircraft climbs on one engine. Another scenario is when the engine or engines fail and the plane is a glider. Lower drag means better glide and more options available for landing safely. The present invention provides these advantages as well as others which will be pointed out below.

An additional problem specifically addressed and rectified by the present invention is that of overheating of aircraft wheel brake assemblies which can impair operation and have harmful and adverse consequences.

The present invention relates to aircraft hubcap structure for attachment to an airplane wheel and tire assembly. The assembly includes a wheel having a wheel wall of circular configuration adjacent to and at least partially covering brake assembly structure and a bearing cover centrally disposed on the wheel wall and extending outwardly therefrom.

The wheel further has a cylindrical rim affixed to the wheel wall, surrounding the bearing cover and projecting outwardly from the wheel wall. The wheel defines a plurality of bolt holes spaced from one another at or adjacent to the bearing cover.

The aircraft hubcap structure includes a dome-shaped hubcap having a circular-shaped periphery and a diameter substantially corresponding to the diameter of the wheel, the dome-shaped hubcap defining a plurality of spaced hubcap holes.

The aircraft hubcap structure also includes a double-ended bushing secured to the dome-shaped hubcap defining a bushing interior and an opening at an end thereof communicating with the bushing interior receiving the bearing cover. Bolts are provided for positioning in the bolt holes defined by the wheel to secure the bushing to the wheel with the bearing cover extending through the opening of the bushing into the bushing interior.

The wheel defines wheel apertures and the dome-shaped hubcap defines a plurality of hubcap holes for allowing passage of ambient air through the dome-shaped hubcap in the direction of the wheel wall.

Impeller vanes are attached to the dome-shaped hubcap adjacent to the hubcap holes for directing ambient air passing through the hubcap holes toward the wheel apertures to promote cooling of the brake assembly structure.

With the present invention the aircraft hubcap structure may be installed without modification of the wheel and tire assembly. This is an important factor since the wheels are tested and certified under a specific design. Drilling or revising the wheel renders the wheel un-airworthy and the impact of such modifications unknown. This could have catastrophic results on a hard landing.

The aircraft hubcap structure is attached to the wheel by bolts extending through previously existing and approved bolt holes. The aircraft hubcap structure disclosed and claimed herein works extremely well on all aircraft, particularly where the landing gear retracts into the wing but leaves the wheel and tire uncovered. This is fairly common since the simplicity of eliminating an additional gear door makes the structure simpler and more reliable.

Other features, advantages and objects of the present invention will become apparent with reference to the following description and accompanying drawings.

BRIEF DESCRIPTION OF DRAWINGS

FIG. 1 is a perspective view illustrating a first embodiment of the aircraft hubcap structure of the present invention in position on an airplane wheel and tire assembly;

FIG. 2 is an exploded, perspective view illustrating a bushing of the present invention installed in place on the wheel and tire assembly, the hubcap component of the first embodiment prior to attachment to the bushing by screws;

FIG. 3 is an exploded, perspective view of the first embodiment showing the bushing removed from the wheel and tire assembly;

FIG. 4 is a perspective view illustrating a second embodiment dome-shaped hubcap in place on the wheel and tire assembly;

FIG. 5 is an enlarged, frontal perspective view of the bushing;

FIG. 6 is an enlarged, rear perspective view of the bushing;

FIG. 7 is an enlarged, perspective, rear view of the first embodiment aircraft hubcap structure showing the underside thereof and illustrating impeller vanes and hubcap holes adjacent thereto;

FIG. 8 is an enlarged, exploded, perspective, rear view showing the underside of the first embodiment dome-shaped hubcap prior to assembly of the impeller vanes.

MODES FOR CARRYING OUT THE INVENTION

Figure 9:
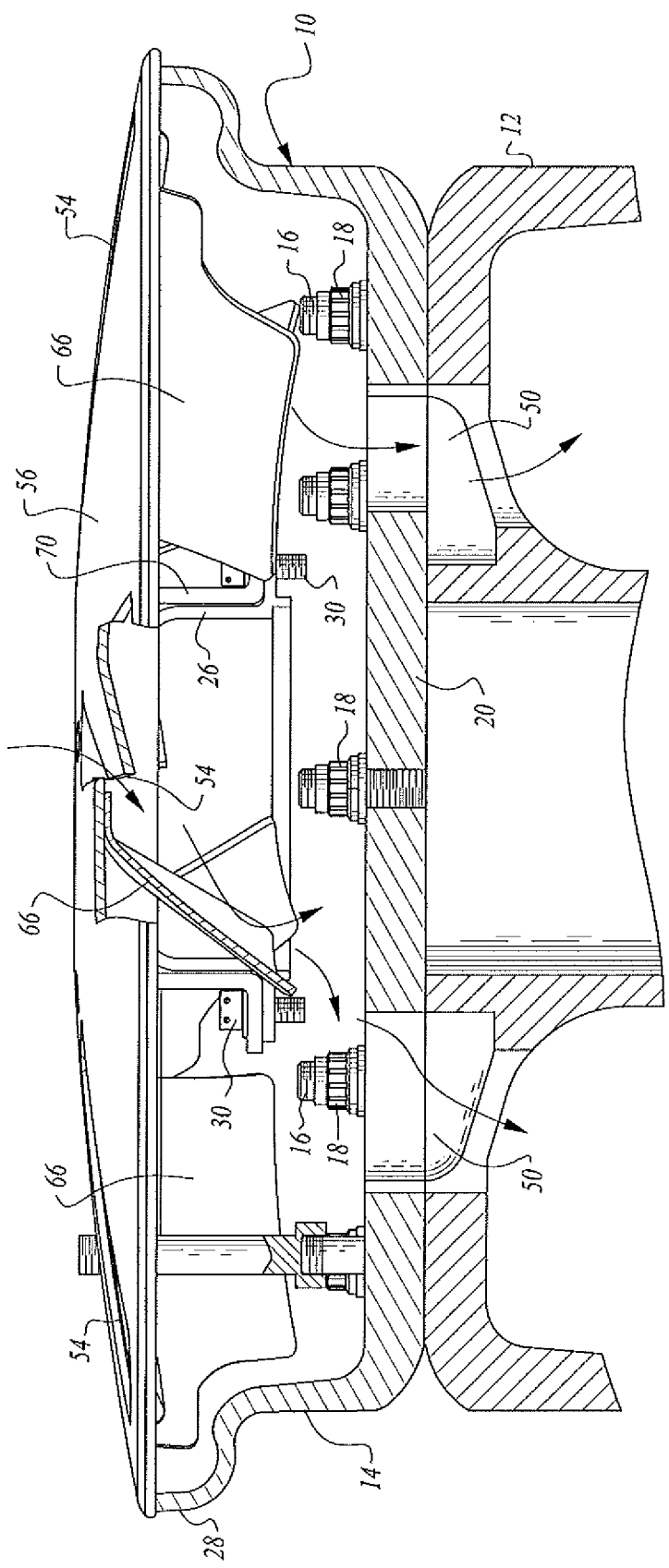
FIG. 9 is a greatly enlarged, cross-sectional view illustrating structural elements of a third embodiment of the aircraft hubcap structure connected to the inner wheel half of the wheel and illustrating air flow path through the assembly by arrows.

Referring to the drawings, an airplane wheel and tire assembly 10 of conventional construction is illustrated. The assembly includes a wheel consisting of an inner wheel half 12 and an outer wheel half 14 secured together by bolts 16 and nuts 18, an arrangement that is representative of a typical wheel assembly employed in aircraft.

The wheel includes a wheel wall 20 of circular configuration adjacent to and partially covering brake assembly structure 22 (FIGS. 2 and 3), such brake assembly structure being of conventional construction. The airplane wheel and tire assembly also includes a bearing cover 26 of conventional construction centrally disposed on the wheel wall 20 and extending outwardly therefrom.

The wheel, in particular wheel half 14, has a circular rim 28 affixed to the wheel wall 20, the circular rim surrounding the bearing cover and projecting outwardly from the wheel wall.

The wheel defines a plurality of preexisting threaded bolt holes in the center area of the outer wheel half which are threadedly engaged with bolts 30 to hold the bearing cover 26 in place. This is shown in FIG. 9 wherein the bearing cover is secured in position. FIG. 9 also illustrates that in accordance with the teachings of the present invention the airplane wheel and tire assembly is maintained in position on the wheel by the bolts 30 as well.

The aircraft hubcap structure of the invention includes a dome-shaped hubcap having a circular-shaped periphery and a diameter substantially corresponding to the diameter of the wheel. The dome-shaped hubcap 32 of the first embodiment and the hubcap 34 of the second embodiment each define a plurality of spaced hubcap holes (identified by reference number 38 in FIG. 2).

In the first and second embodiments a double-ended bushing 40 defining a bushing interior and an opening 42 at an end thereof communicating with the bushing interior receives the bearing cover 26. The bolts 30 are then screwed into the bolt holes of the wheel, the bearing cover extending through the opening of the bushing into hushing interior. FIG. 2 shows the bushing held in place along with cover 26 by the bolts 30. In the arrangement shown, there are three such bolt holes and bolts 30.

After the bushing 40 has been secured into place, screws 46 are to connect the dome-shaped hubcap to the double-ended bushing. FIG. 2 shows the relative positions of the dome-shaped hubcap and the bushing prior to assembly by screws 46. The center of the bushing is open and nut plates 48 (see FIG. 6) installed about the bushing opening receive the screws 46.

The wheel of the wheel and tire assembly defines wheel apertures 50 (see FIG. 9) which extend through inner wheel half 12 and outer wheel half 14 and are in communication with the brake assembly structure.

The dome-shaped hubcap 32 of the first embodiment and the dome-shaped hubcap 56 shown in FIG. 9 define a plurality of hubcap holes 54 which allow passage of ambient air through the dome-shaped hubcap in the direction of the wheel wall 20. The dome-shaped hubcaps of all three disclosed embodiments have a convex, smoothly curved outer surface to promote smooth air flow past the wheel. Each of the dome-shaped hubcaps extends beyond the cylindrical rim of the outer wheel half and does not engage the tire 60 of the wheel end tire assembly. The dome-shaped hubcap will extend over the edge of the rim and help with the transition of the air flow from hubcap to tire where there is a space. The dome-shaped hubcap and tire will not touch, but are in close proximity to each other. This configuration will reduce water contamination potential as the angle of hubcap will angle down towards the tire and act as an edge to keep moisture out.

The aircraft hubcap structure additionally includes impeller vanes 66 attached to the inside surface of the dome-shaped hubcaps 32 and 56. These impeller vanes are adjacent to the hubcap holes 54 and are for directing ambient air passing through the hubcap holes toward the wheel apertures 50 to promote cooling of the brake assembly structure. FIG. 9 illustrates by means of arrows air flow through the hubcap holes and the wheel apertures to the vicinity of the brake assembly structure (not shown in FIG. 9).

The vanes may be attached separately to the dome-shaped hubcap and attached thereto by any suitable means such as lamination or adhesive. Alternatively, the vanes may be integrally molded or otherwise formed as a single piece construction with the dome-shaped housing. Another possibility will be to have all the vanes interconnected in a separate laminate which is affixed to the underside of the dome-shaped hubcap. In any event, the air movement caused by the impeller vanes will extract heat from the brakes and lower absolute temperature of the brake rotors and pressure plates. This will improve the reliability and effectiveness of the braking system.

The third embodiment (FIG. 9) of the invention differs from those of the other two embodiments in that the dome-shaped hubcap 56 is integrally formed with the bushing (identified as bushing 70 in FIG. 9) to provide a single piece construction.

The invention claimed is:

1. Aircraft hubcap structure for attachment to an airplane wheel and tire assembly, said assembly including a wheel having a wheel wall of circular configuration adjacent to and at least partially covering brake assembly structure and a bearing cover centrally disposed on said wheel wall and extending outwardly therefrom, said wheel further having a cylindrical rim affixed to said wheel wall, surrounding said bearing cover and projecting outwardly from said wheel wall, said wheel defining a plurality of bolt holes spaced from one another at or adjacent to said bearing cover and said wheel wall defining wheel apertures in communication with the brake assembly structure, said aircraft hubcap structure including, in combination:

a dome-shaped hubcap having a circular-shaped periphery and a diameter substantially corresponding to the diameter of said wheel, said dome-shaped hubcap defining a plurality of spaced hubcap holes for allowing the passage of air through said dome-shaped hubcap holes and between said hubcap holes and said wheel apertures;

a double-ended bushing secured to the dome-shaped hubcap defining a bushing interior and an opening at an end thereof communicating with said bushing interior receiving said bearing cover;

bolts for positioning in the bolt holes defined by said wheel to secure said bushing to said wheel with said bearing cover extending through the opening of said bushing into said bushing interior; and impeller vanes attached to said dome-shaped hubcap adjacent to said hubcap holes for directing ambient air passing through said hubcap holes toward said wheel apertures to promote cooling of said brake assembly structure, said impeller vanes inclined inwardly in the direction of said wheel apertures, said dome-shaped hubcap having a convex, smoothly curved outer surface to promote smooth air flow past the wheel, said dome-shaped hubcap engageable with said cylindrical rim and extending beyond the cylindrical rim but not engaging the tire of said wheel and tire assembly when installed on said cylindrical rim.

2. The aircraft hubcap structure according to claim 1 wherein said wheel includes an inner wheel half and an outer wheel half, said dome-shaped hubcap engageable with said outer wheel half to cover the outer wheel half, said wheel apertures extending through both said outer wheel half and said inner wheel half.

3. The aircraft hubcap structure according to claim 1 wherein said impeller vanes and said dome-shaped hubcap are of unitary construction.

4. The aircraft hubcap structure according to claim 1 wherein said impeller vanes are laminated to the dome-shaped hubcap.

5. The aircraft hubcap structure according to claim 1 additionally including mechanical connector structure utilized to secure said dome-shaped hubcap to the bushing.

6. The aircraft hubcap structure according to claim 1 wherein said dome-shaped hubcap and said double-ended bushing are of single piece construction.

7. In combination:
an airplane wheel and tire assembly including a wheel having a wheel wall of circular configuration adjacent to and at least partially covering brake assembly structure and a bearing cover centrally disposed on said wheel wall and extending outwardly therefrom, said wheel further having a cylindrical rim affixed to said wheel wall, surrounding said bearing cover and projecting outwardly from said wheel wall, said wheel defining a plurality of bolt holes spaced from one another at or adjacent to said bearing cover;
aircraft hubcap structure including a dome-shaped hubcap having a circular-shaped periphery and a diameter substantially corresponding to the diameter of said wheel, said dome-shaped hubcap defining a plurality of spaced hubcap holes for allowing the passage of air through said dome-shaped hubcap, a double-ended bushing secured to the dome-shaped hubcap defining a bushing interior and an opening at an end thereof communicating with said bushing interior receiving said bearing cover, and bolts positioned in the bolt holes defined by said wheel securing said bushing to said wheel with said bearing cover extending through the opening of said bushing into said bushing interior, said wheel wall defining wheel apertures in communication with the brake assembly structure and said dome-shaped hubcap defining a plurality of hubcap holes for allowing passage of ambient air through said dome-shaped hubcap holes and between said hubcap holes and said wheel apertures; and
impeller vanes attached to said dome-shaped hubcap adjacent to said hubcap holes for directing ambient air passing through said hubcap holes toward said wheel apertures to promote cooling of said brake assembly structure, said impeller vanes inclined inwardly in the direction of said wheel apertures, said dome-shaped hubcap having a convex, smoothly curved outer surface to promote smooth air flow past the wheel, said dome-shaped hubcap engaging said cylindrical rim and extending beyond the cylindrical rim but not engaging the tire of said wheel and tire assembly.

8. The combination according to claim 7 wherein said wheel includes an inner wheel half and an outer wheel half, said dome-shaped hubcap engaging said outer wheel half to cover the outer wheel half, said wheel apertures extending through both said outer wheel half and said inner wheel half.

9. The combination according to claim 7 wherein said impeller vanes and said dome-shaped hubcap are of unitary construction.

10. The combination according to claim 9 wherein said impeller vanes are laminated to the dome-shaped hubcap.

11. The combination according to claim 7 wherein mechanical connector structure secures said dome-shaped hubcap to the bushing end spaced from the wheel.

12. The combination according to claim 7 wherein said dome-shaped hubcap and said double-ended bushing are of single piece construction.

* * * * *